Patented Aug. 25, 1953

2,650,228

UNITED STATES PATENT OFFICE

2,650,228

DERIVATIVES OF 2:3-DIHYDRO-4-METHYL-THIENO(3:2-c) QUINOLINE AND PREPARATION THEREOF

Helmut Timmler, Hans Andersag, and Stephan Breitner, Wuppertal-Elberfeld, Germany, assignors to Schenley Industries, Inc., New York, N. Y., a corporation of Delaware No Drawing. Application May 28, 1951, Serial No. 228,762. In Germany May 27, 1950

7 Claims. (Cl. 260—288)

This invention relates generally to the synthesis of novel organic chemical compounds and, more particularly, it is concerned with the synthesis of polynuclear heterocyclic compounds useful in chemotherapy.

This application is related to our copending application Serial No. 228,761 filed May 28, 1951, as a companion application for the sulfur isologs of the same series of compounds. These compounds have interesting and useful properties making them suitable for use in chemotherapy particularly as analgesics, stimulants and as amoebicides. This application is similarly related to our copending application Serial No. 228,765 also filed on May 28, 1951.

The novel compounds of this invention may be regarded as derived from 2:3-dihydro-4-methyl-thieno (3:2-c) quinoline, which is represented by the formula:

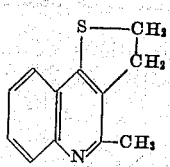

having a bridging group, linked to one pair of adjacent positions of the bz nucleus, which comprises a secondary amino group in a chain with two carbon atoms linked by a double bond, which may be represented by the formula:

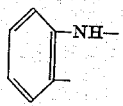

Compounds of this invention may be prepared easily by treatment of a correspondingly substituted Schiff's base type compound, derived from the condensation of α-acetyl-butyrolactone with a suitably substituted aniline. When the Schiff's base is treated with phosphorus pentasulfide, or when it is treated with phosphorus oxychloride followed by reaction with thiourea, the desired final product is obtained. These reactions may be represented as follows:

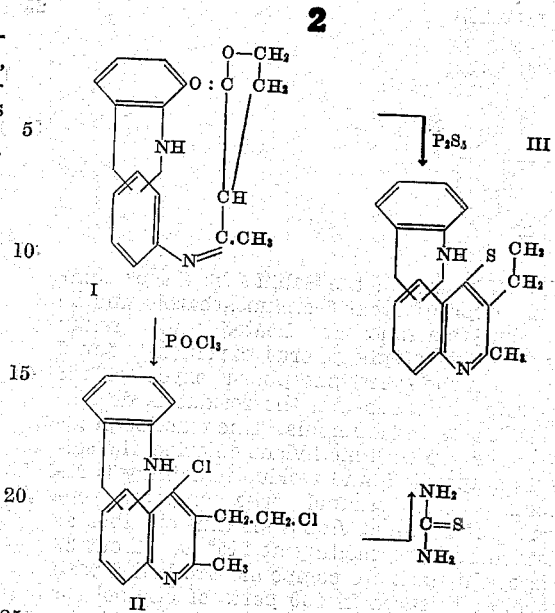

These reactions are preferably conducted in suitable solvent media. For instance, it is preferred to treat the Schiff's base with phosphorus pentasulfide in a high boiling organic solvent, such as diphenyl ether adding the reagent gradually and maintaining the reaction mixture at a temperature of about 200° C. upwards to the boiling point of the reaction mixture. The desired final product may be shaken out with ether and recovered from the ethereal extract in the usual manner.

The two step reaction involving initial treatment of the Schiff's base with phosphorus oxychloride, is performed in a liquid hydrocarbon solvent, such as xylene, and the subsequent reaction of this dichloro intermediate product with thiourea is performed in a lower alkanol, such as ethanol.

To facilitate a better understanding of the subject matter of this invention, examples illustrating the synthesis of specific compounds herewith follow, but it is clearly to be understood that these examples are provided by way of illustration merely, and are not to be construed as being limitations upon the scope of the invention.

Example 1

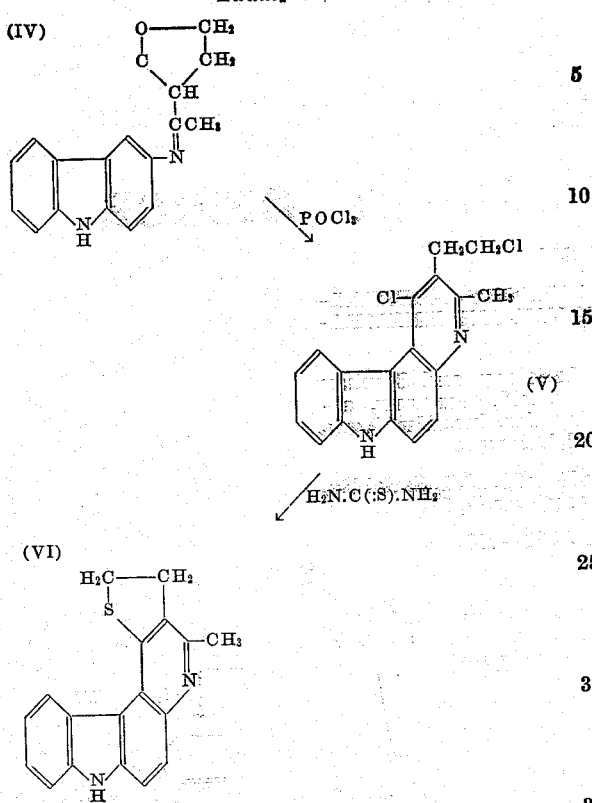

About 15 parts of the Schiff's base type compound, prepared from 3-aminocarbazole and α-acetyl-butyrolactone, are heated under reflux with 10 parts of phosphorus oxychloride for 2 hours, then the excess phosphorus oxychloride is evaporated in vacuo and the residue is decomposed with ice and ammonia. The reaction product is taken up with methylene chloride, the solvent is evaporated, and residue remaining is recrystallized from ethanol. The compound represented by Formula V above is thus obtained as yellowish crystals, melting at 215° C. About 33 parts of this dichloro compound are boiled with 8 parts of thiourea in 300 parts of ethanol for one hour. The precipitated yellow material which forms is the hydrochloride of the compound represented by Formula VI above. It is removed by filtration, dissolved in a large quantity of hot water, and the free base is precipitated by addition of ammonium hydroxide. After recrystallization from ethanol, the purified product is obtained as prismatic needles, melting at 243° C.

Example 2

The same final product (VI) of Example 1 may be obtained directly by treatment of the Schiff's base starting material (IV) with phosphorus pentasulfide in a diphenyl ether reaction medium at a temperature of about 220° C. The reagent is added slowly and after its addition is completed, the reaction mixture is maintained at about 220° C. for an additional half hour, then it is cooled, the supernatant liquor is decanted and the residue is treated with dilute ammonium hydroxide solution. The free base thus formed is taken up with ether, shaken out with dilute hydrochloric acid and clarified with animal charcoal, then precipitated by addition of ammonium hydroxide solution and crystallized from ligroin.

Example 3

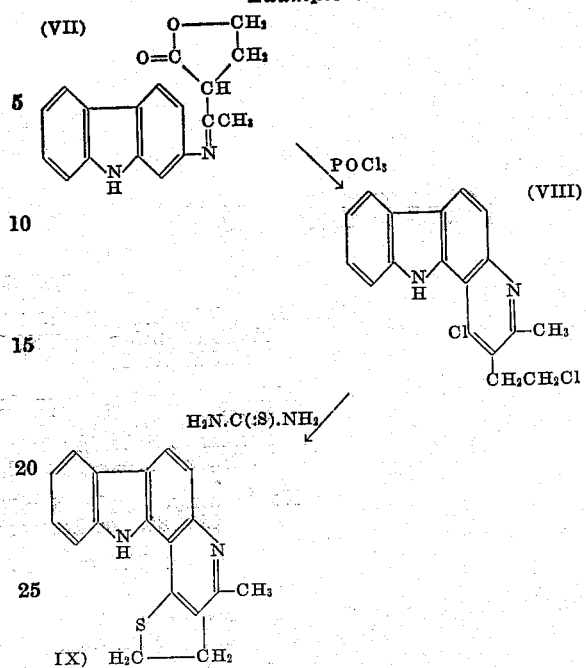

A Schiff's base type compound represented by Formula VII, prepared by condensing 2-aminocarbazole and α-acetyl-butyrolactone, is treated with phosphorus oxychloride, as described in Example 1, to produce the corresponding dichloro intermediate compound represented by Formula VIII, melting point 212° C., and, by treating this intermediate with thiourea and purifying the reaction product as described in Example 1, the desired final product, represented by Formula IX, is obtained, having the melting point 258° C.

The same product, represented by the Formula IX, may be obtained by treatment of the Schiff's base starting material VII with phosphorus pentasulfide as described in Example 2.

Having thus described the subject matter of this invention, what it is desired to secure by Letters Patent is:

1. As new compositions of matter, chemical compounds represented by the formula:

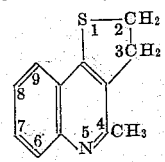

having a bridging group, linked to one pair of adjacent positions of the bz nucleus, which comprises a secondary amino group in a chain with two doubly linked carbon atoms having the formula

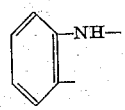

2. A compound defined in claim 1 wherein the bridging group is across the 8:9 positions.

3. A compound represented by the formula

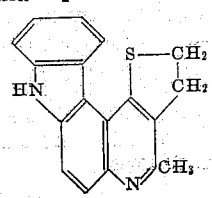

4. A compound represented by the formula:

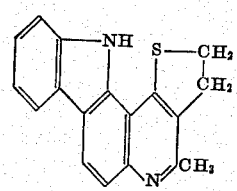

5. Process for the preparation of organic chemical compounds represented by the formula:

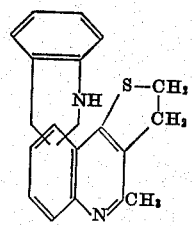

that comprises treating with phosphorus oxychloride, at an elevated temperature and while dissolved in a liquid hydrocarbon solvent, a compound represented by the formula:

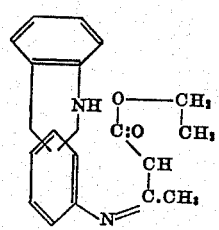

whereby a dichloro-compound is formed, represented by the formula:

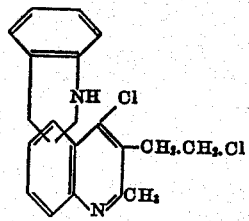

reacting this dichloro-compound, at an elevated temperature and while dissolved in a lower alkanol, with thiourea to form the desired final product, and recovering this product from the reaction mixture.

6. Process for the preparation of organic chemical compounds represented as follows:

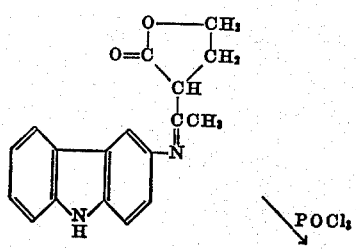

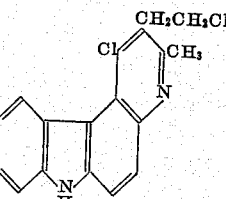

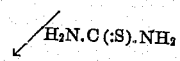

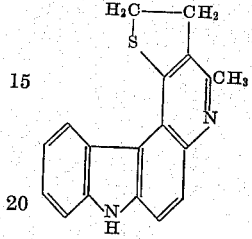

characterized in that the Schiff's base starting material is refluxed in a liquid hydrocarbon solvent with phosphorus oxychloride to form the indicated dichloro-compound, and this dichloro-compound is converted to the indicated final product by heating it, while dissolved in a lower alkanol, with thiourea.

7. Process for the preparation of organic chemical compounds represented as follows:

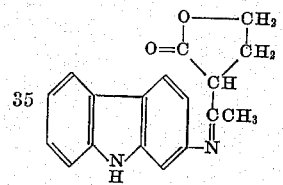

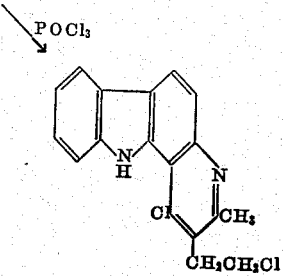

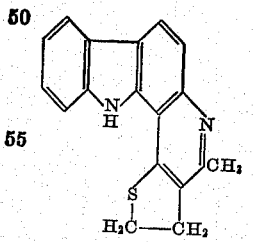

characterized in that the Schiff's base starting material is refluxed in a liquid hydrocarbon solvent with phosphorus oxychloride to form the indicated dichloro-compound, and this dichloro-compound is converted to the indicated final product by heating it, while dissolved in a lower alkanol, with thiourea.

HELMUT TIMMLER.
HANS ANDERSAG.
STEPHAN BREITNER.

No references cited.